United States Patent [19]

Godard et al.

[11] 4,065,712

[45] Dec. 27, 1977

[54] RAPID CHARGING SYSTEM AND METHOD FOR SEALED STORAGE CELLS

[75] Inventors: Pierre Godard, Livry-Gargan; Robert Henri Lapuyade, Andilly, both of France

[73] Assignee: Societe des Accumulateurs Fixes et de Traction, France

[21] Appl. No.: 438,654

[22] Filed: Feb. 1, 1974

Related U.S. Application Data

[63] Continuation of Ser. No. 193,301, Oct. 28, 1971, abandoned.

[30] Foreign Application Priority Data

Oct. 30, 1970 France .............................. 70.39139
Dec. 21, 1970 France .............................. 70.46044

[51] Int. Cl.² .............................................. H02J 7/04
[52] U.S. Cl. ...................................... 320/39; 320/23; 320/35; 320/DIG. 2
[58] Field of Search .................... 320/20, 22, 35, 39, 320/40; 322/28

[56] References Cited

U.S. PATENT DOCUMENTS

| | | | |
|---|---|---|---|
| 3,531,706 | 9/1970 | Mullersman | 320/20 |
| 3,585,482 | 6/1971 | Zelina | 320/35 X |
| 3,602,796 | 8/1971 | Bleher | 322/28 |

Primary Examiner—Robert J. Hickey
Attorney, Agent, or Firm—Kenyon & Kenyon, Reilly, Carr & Chapin

[57] ABSTRACT

A system and method for effecting rapid safe charging of sealed storage cells embodying a charger to supplying a rapid high rate charging current to the cells or battery of cells with interruption but once during charging, at an optimum time to prevent cell or battery damage, the timing of this interruption being effected by change in magnitude of a continuous control signal by means incorporated in the cell or battery. This magnitude changes when voltage across the cell terminals increases above a reference voltage that varies with change in battery or cell temperature, the change in said magnitude of the control signal serving to effect interruption of rapid charging. Subsequent to this interruption charging at a slower rate proceeds to complete the charge of the sealed cell or battery of such cells.

6 Claims, 6 Drawing Figures

RAPID CHARGING SYSTEM AND METHOD FOR SEALED STORAGE CELLS

This is a continuation of application Ser. No. 193,301, filed Oct. 28, 1971, now abandoned.

RELATED APPLICATIONS

No related applications are copending.

BACKGROUND OF INVENTION

The present invention relates to a system and process for effecting the rapid charging of a battery of sealed storage cells. The present invention also relates to an assembly for permitting the rapid charging of a battery of sealed storage cells comprising a charger and means incorporated in the battery cooperating with the charger to control the latter.

It will readily be understood that a battery of storage cells will satisfy a wider range of application requirements, whether in industrial or in everyday life, if it is capable of being rapidly recharged. The physical problems relating to the rapid charging of sealed storage cells are concerned essentially with the inner pressure of the sealed storage cell and the temperature thereof; an excessively high internal pressure or an excessively high temperature may result in damage to the storage cell. In order not to exceed the safe limiting value permitted for the pressure, it is necessary to know that the charging state of the battery, determined by the value of its charging parameters such as the voltage across the terminals of the storage cell or cells and their temperature. These two charging parameters, i.e. temperature of the storage cell or cells and charging voltage, are not independent; during the final phase of rapid charging, the internal temperature of the storage cell increases, as does also the voltage across the terminals of the battery, and the problem which arises is how to interrupt the rapid charging rate at an opportune instant. This instant should be, on the one hand, sufficiently late to ensure that the battery or cell is either completely charged, or else charged to a sufficient percentage of its total charge and, on the other hand, of course, should be sufficiently timed to ensure that the battery will not be damaged.

Some known processes for the rapid charging of storage cells consist in charging the storage cell at a rapid rate and partially discharging it extremely rapidly and at extremely short intervals during charging, in such manner as to monitor the potential difference across the terminals of the storage cells. In the case of sealed nickel-cadmium storage cells, this known process makes it possible to interrupt high rate charging before the potential of the negative electrode reaches the threshold corresponding to hydrogen evolution. However, the devices for the carrying into effect of these processes are complex and costly. Other processes also have been proposed for the rapid charging of sealed storage cells; for example, one of the said processes, disclosed in French Pat. No. 1,565,095, filed on the 26th Apr. of 1968 in the name of GENERAL ELECTRIC COMPANY, and corresponding to U.S. Pat. No. 3,531,706 consists in charging the battery during every other half-wave, measuring the voltage across the terminals of the storage cells during the other half-wave during which the battery is not being charged, detecting the temperature of the storage cells with the aid of a blade thermistor and, with the aid of a blade switch opening the charging circuit before there is any risk of damage to the cell. The disclosed device of this specification, although it permits rapid charging of sealed storage cells, nevertheless has the disadvantage that it does not afford adequate reproducibility to permit the employment of the same charger for charging a plurality of batteries.

On the other hand, when a rapid charger is connected to the a. c. mains, it is current practice to feed the charger through intermediary of a magnetic leakage transformer or through the intermediary of a conventional transformer and a stabilization inductance. For a charger designed to charge a battery of storage cells of relatively high power, equipment of this kind is heavy and a charger fitted with a transformer represents a weight which renders the utilization thereof inconvenient in practice.

The present invention makes it possible to obviate these disadvantages and provides a rapid-charging device for sealed storage cells which is of great simplicity and has a high degree of reliability. The novel device or system permits the charging of the storage cell or battery during a reduced period of time for obtaining almost complete charging. Furthermore, the device or system is equipped with a slow charging circuit permitting the completion of charge after rapid charging has been halted. The device or system according to the invention comprises means for reliably interrupting rapid charging before the occurrence of any risk of damage to the cell or cells. Finally, according to an embodiment of the invention, the charger is readily transportable due to the elimination of the feed transformer.

BRIEF SUMMARY OF INVENTION

The process according to the invention is characterized in that it comprises: comparing, in permanent fashion, the voltage across the terminals of the battery during, the passage of the rapid-charging or high rate current with a reference voltage which varies in accord with the battery temperature; providing in permanent manner, during the duration of battery charging, a continuous signal which changes its magnitude when the voltage across the terminals of the battery has become higher than the said reference voltage, and is utilized for interrupting the rapid charging when the said signal changes its magnitude.

The invention also relates to an assembly or system for the rapid d. c. type charging of a sealed storage cell or battery of sealed storage cells, characterized in that it comprises: means incorporated in the battery and in thermal contact with the said storage cell or cells for producing a reference voltage varying with the temperature of the storage cell or cells; a charger comprising a rapid charging circuit incorporating a circuit breaker and a circuit for triggering the said circuit breaker, said circuit incorporating a means for permanently comparing the said reference voltage and the voltage across the terminals of the battery during the passage of the rapid charging current, means connected to the comparison means for permanently supplying a continuous signal to the terminals of the said circuit breaker, in such manner as to open the circuit breaker upon change of magnitude of the said continuous signal.

The assembly or system according to the invention has, preferably, one and/or the other of the following features: the said means incorporated in the battery comprises an assembly of series-connected diodes; the said means comprises furthermore an adjusting resistor in series with the assembly of diodes; the said assembly of diodes and the adjusting resistor are connected across the terminals of a Zener diode through intermediary of a resistor in such manner that a constant current flows therethrough during charging; the said battery is furthermore provided with a safety thermostat acting on the said circuit breaker of the said charger.

The invention also relates to a constant-current charger for a sealed storage cell or battery of sealed storage cells characterized in that it comprises a rapid charging circuit incorporating a circuit breaker and a circuit for triggering the said circuit breaker incorporating a means for permanently comparing the voltage across the terminals of the battery with a reference voltage during the passage of rapid charging current, means connected to the said comparison means for permanently supplying a continuous signal to the terminals of the said circuit breaker, in such manner as to open the circuit breaker upon changing of magnitude of the said continuous signal.

According to an advantageous embodiment of the invention, the rapid charger is characterized in that it comprises furthermore, connected in parallel with the rapid charging circuit, a slow charging circuit for charging the battery at the slow rate when the period of rapid charging is terminated.

The charger according to the invention has, preferably, one and/or the other of the following features or characteristics: the said circuit breaker is a thyristor, which is conductive in the rapid charging state and is blocked in the slow charging state; the said comparison means is constituted by a differential amplifier having two transistors comparing the said reference voltage with a fraction of the voltage across the terminals of the battery, obtained by means of a divider bridge; the said fraction of the voltage across the terminals of the battery is obtained by means of a resistive divider bridge and is filtered by means of a condenser; the said means for permanently supplying the said continuous signal is constituted by a transistor connected across the terminals of the circuit of the trigger or gate of the said thyristor and to the said differential amplifier through the intermediary of a two-transistor circuit providing for a clear change of state in the said transistor connected across the terminals of the thyristor trigger; the said transistor is connected across the terminals of the trigger circuit of the said thyristor through intermediary of a capacitor.

According to a further advantageous mode or embodiment, the charger according to the invention is characterized in that it is connected to the a.c. mains through the intermediary of a transformer and a rectifier bridge.

According to a further advantageous mode of embodiment, the charger according to the invention is characterized in that the said thyristor forms part of a power circuit connected to the a.c. mains and comprising, in series with the said thyristor, a monophase rectifier bridge, an inductor and a current regulation circuit and a diode in parallel with the said rectifier bridge and the thyristor. Furthermore in this case, the charger comprises a circuit for exciting the thyristor connected to the said power circuit, comprising a single-junction transistor associated with a transistor circuit varying the angle of excitation of the said thyristor to compensate for the variations in the input voltage of the power circuit, in such manner as to maintain constant the charging current of the battery.

Preferably, the said current-regulating circuit comprises a shunt connected to a differential transistor-type amplifier.

Finally, the invention also relates to a battery of sealed storage cells designed to undergo rapid charging, characterized in that it comprises an assembly of silicon diodes in thermal contact with the storage cells, connected in series and in series with an adjusting resistor, the voltage across the terminals of the diodes and of the adjusting resistor being taken as a reference voltage for service in interrupting rapid charging.

Other objects, features and characteristics of the invention are described hereinbelow, in examples, which are entirely non-limitative, of the assembly according to the invention and with reference to the accompanying drawings, wherein:

FIG. 2 shows the zone, under voltage, of interruption of rapid charging as a function of the temperature of the storage cells;

DETAILED DESCRIPTION

Figure 1:
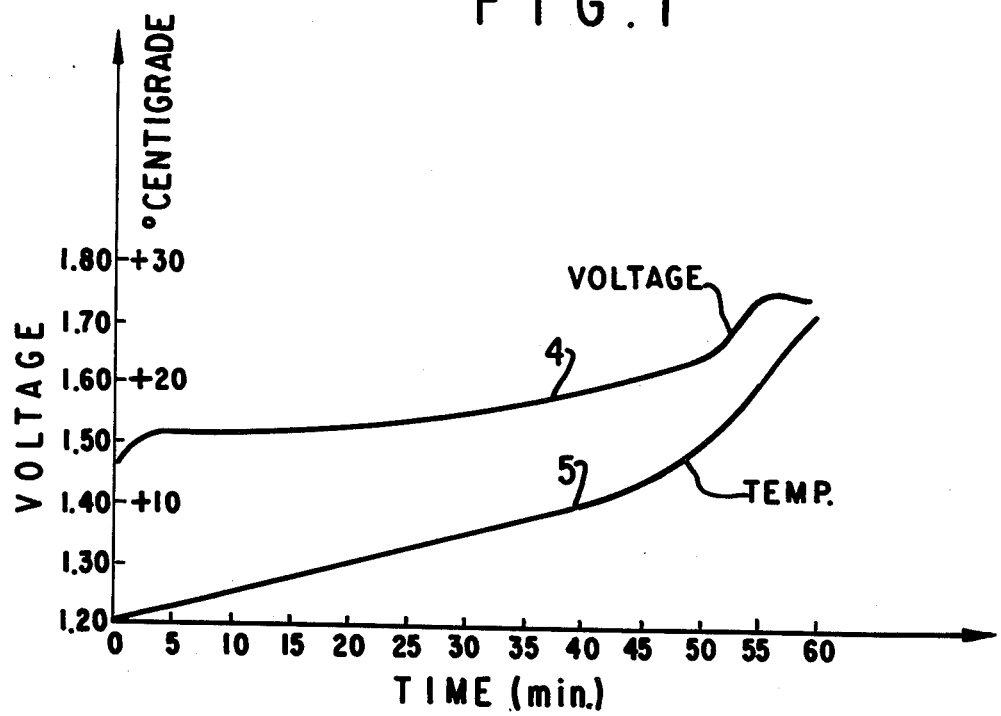

Referring to the drawing, FIG. 1 shows, during rapid charging of sealed storage cells of the type specified, the curves 4 and 5 representing respectively, the voltage across the terminals of the storage cells and their temperature as a function of time. With regard to this selective example, during the first fifty minutes the voltage across the terminals of the element curve 4 exhibits first of all a zone of slow ascent, then a zone or rapid ascent before attaining a maximum, whereafter it decreases. In order to obtain this curve (by way of illustration) the test was voluntarily prolonged, it being understood that it is advisable to interrupt rapid charging approximately at the center of the zone of rapid ascent before attaining the maximum, i.e., in the case of this figure, between 50 and 55 minutes; in fact, when the maximum is attained, there is a risk of exceeding the pressure and temperature safety threshold of the battery and there is a danger that the battery may be damaged.

The curve 5, corresponding to the variations in the temperature as a function of time, also exhibits a zone of relatively slow ascent and a zone of rapid ascent; equally apparent is the necessity to interrupt the rapid charging current in the zone of rapid ascent, corresponding to the similar zone of rapid ascent of the voltage curve 4.

Figure 2:
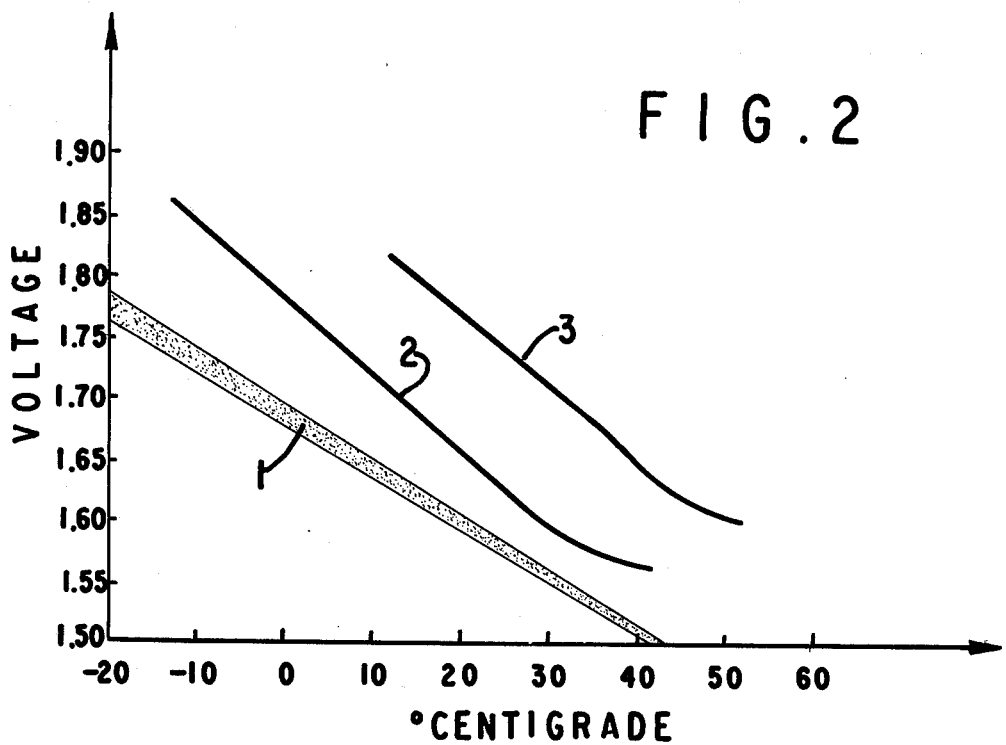
FIG. 2 shows plots of the curves of the voltage across the terminals of the cells and of their temperature as a function of time, during rapid charging.

In the diagram of FIG. 2 wherein rapid charging interruption voltage and temperature of the cells are plotted, zone 1 represents the zone of interruption of rapid charging with respect to sealed nickel-cadmium storage cells. It will be noted that zone 1 is located below the curves 2 and 3 representing respectively, the maximum charging voltages which can be attained by the sealed nickel-cadmium storage cells of two types, representing the extreme utilization possiblities, and intended to be charged by a battery charger according to the invention. The cut-off zone 1 indicates at what voltage, for a given temperature, it is necessary to interrupt the rapid charging of the storage cells.

FIGS. 1 and 2 show a certain dependency between the temperature and the voltage of the storage cells. The employment of the two parameters thus tied with each other, i.e. voltage and temperature, is essential for achieving the rapid charging of sealed storage cells and for interrupting rapid charging at the opportune moment.

The assembly according to the invention makes it possible to obtain almost complete charging during an extremely short period of time, less than 1 hour in the case of the example selected. After this period of rapid charging, and as will be set forth hereinbelow, it is possible to complete charging at a slower rate, so as to obtain complete charging.

Figure 3:
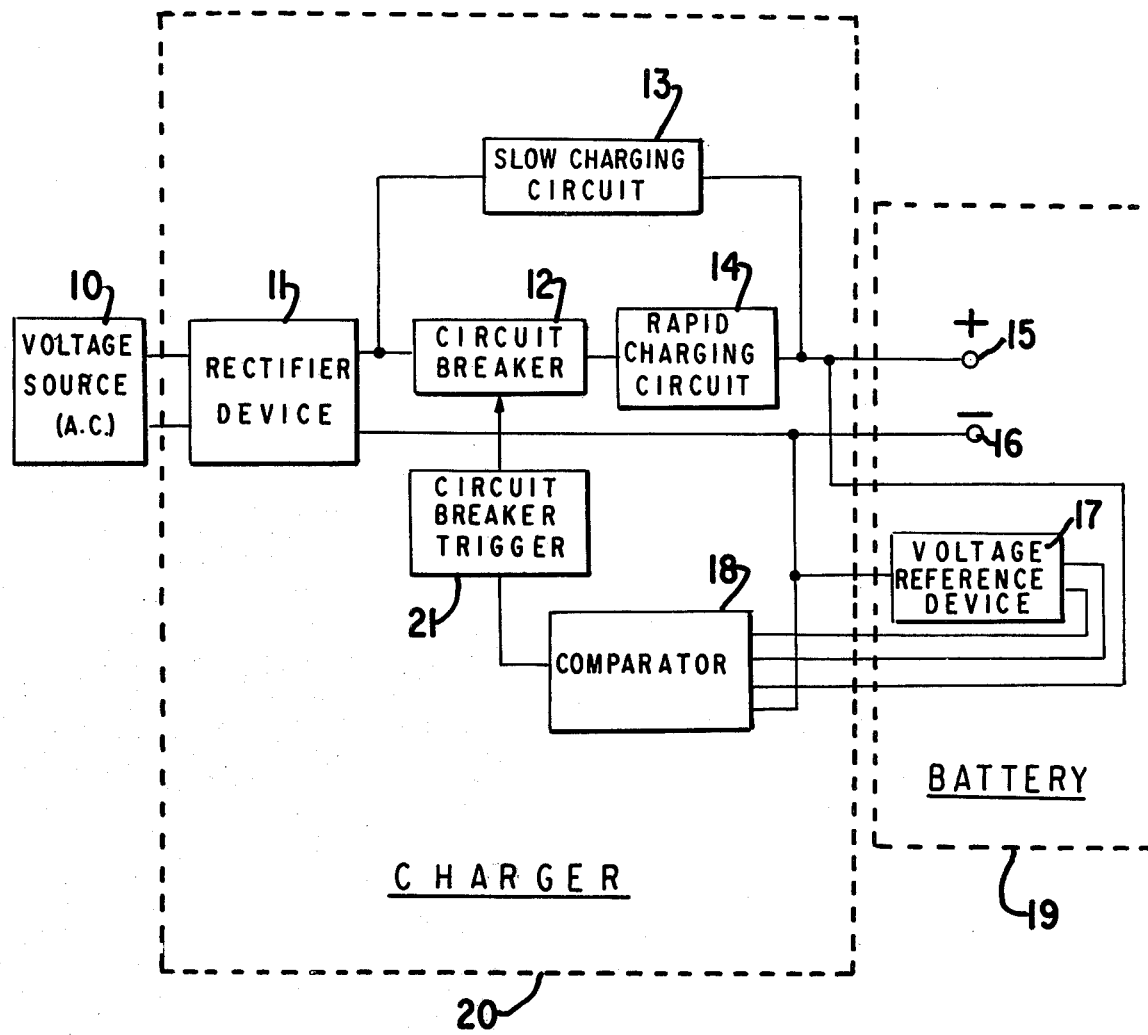
FIG. 3 shows a general block wiring diagram of an assembly or system embodying the invention.

FIG. 3 shows a block diagram of the assembly or system according to this invention. The block 20 represents the charger according to the invention and the block 19 of the battery of sealed storage cells intended to be charged. Reference numeral 10 represents a source of voltage; in this example, what is concerned is a source of a.c. voltage. The source of voltage 10 is connected to a rectifier device 11. The rapid charging circuit 14 is connected to the rectifier 11 through intermediary of the circuit breaker 12. Reference numerals 15 and 16 designate the terminals of the battery. As a variant, a slow charging circuit 13 is connected across the terminals of the assembly comprising the circuit breaker 12 and the rapid charging circuit 14. Reference numeral 17 designates a device connected in the battery and supplying a voltage reference at its output; the said device is an element which is responsive to the temperature of the storage cells, in such manner that the reference voltage which is supplied is variable with the temperature of the storage cells. The device 17 is connected to a comparator 18, which is also connected across the terminals 15 and 16 of the battery. The comparator 18 is connected to a trigger device 21 which, finally, acts on the circuit breaker 12.

The functioning of the assembly or system according to the invention is as follows: At the commencement of charging, the circuit breaker 12 is closed and the battery is charged by the rapid charging circuit 14. In accordance with the explanation given hereabove with reference to FIGS. 1 and 2, while the rapid charging current remains practically constant, the charging voltage increases in course of time; similarly, the temperature of the cells increases during rapid charging. It follows that the reference voltage delivered by the device 17 varies and, in this case, increases. According to the invention, the device 17 is selected in such manner that the reference voltage which it supplies undergoes variations with temperature which are substantially analogous to the variations shown in FIG. 2 of the charging circuit cut-off voltage as a function of temperature. This is a considerable advantage of the invention in affording a reference voltage which varies with temperature, as indicated. In fact, in a predetermined charging state close to complete charging of the battery, the charging voltage across the terminals 15 and 16 exceeds the reference voltage supplied by 17. The comparator then transmits information to the device 21, which triggers the opening of the circuit breaker 12. The trigger device 21, which will be better understood in the course of the subsequent description, transmits, in reality, a continuous signal to the circuit breaker which, depending on the magnitude of the said signal, will first of all be closed and then will be open. During the charging of a battery, the circuit breaker is opened only once; thus charging is first of all rapid, and is subsequently slow.

Figure 4:
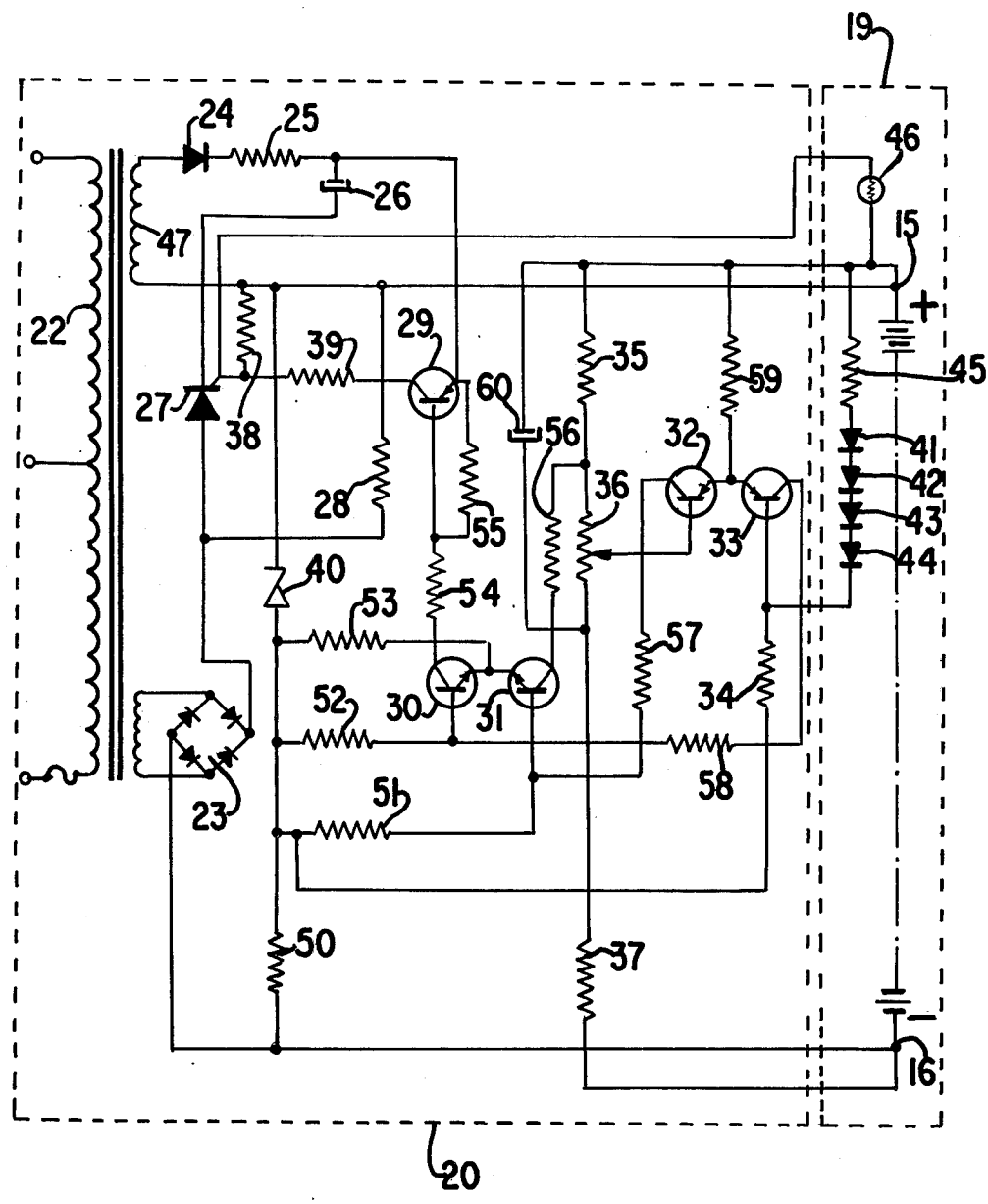
FIG. 4 shows the electronic diagram of the assembly or system permitting rapid charging, according to the invention.

FIG. 4 shows the electronic diagram of an assembly or system permitting rapid charging according to the invention. The feed of the charging circuit is effected with the aid of a magnetic leakage transformer 22. The said transformer is connected to a diode-type rectifier circuit 23. The said rectifier is connected across the terminals 15 and 16 of the battery through intermediary of the thyristor 27. The circuit of the thyristor gate or trigger is fed by the auxiliary winding 47 of the transformer 22 and comprises the diode 24 having the function of a half wave rectifier, and a filter constituted by the resistor 25 and the capacitor 26. Reference numeral 29 designates the transistor energizing the trigger; the resistors 38 and 39 are trigger resistors. When the thyristor 27 is blocked, the charging current flows through the resistor 28 being reduced thereby. The resistor 55 is the emitter resistor of the transisitor 29.

The diodes 41, 42, 43 and 44 are mounted in the battery 19 and responsive to its temperature. The resistor 45, connected in series therewith, is an adjusting resistor. The resistors 35 and 37 constitute a voltage divider bridge connected across the terminals 15 and 16 of the battery; the fraction of the said voltage thus obtained is adjustable by means of the potentiometer 36. When the charger 20 is connected across the terminals 15 and 16 of the battery, the diodes 41, 42, 43 and 44 constitute a portion of a circuit fed by the Zener diode 40 and comprising the resistor 34, the Zener diode 40 being connected to the negative terminals by means of the resistor 50. The transistors 32 and 33 are connected as a common transmitter and their circuit comprises, in conventional manner, the resistors 57, 58 and 59. The fraction of the battery voltage supplied by the divider bridge is filtered by the capacitor 60. The said amplifier provided by transistors 32–33 is connected to the control transistor 29 through intermediary of a second differential amplifier grouping comprising the two transistors 30 and 31, connected as a common emitter; the common terminal of the emitter thereof is connected to one of the terminals of the Zener diode 40 through intermediary of the resistor 53; their respective bases are connected to the same point through intermediary of resistors 51 and 52. The collector of 31 is fed by the resistor 56 and the collector of the transistor 30 is connected to the base of the transistor 29 by the resistor 54. The battery 19 comprises furthermore a safety thermostat 46 connected so as to be capable of blocking the thyristor 27 in the event of excessive heating.

The mode of functioning of the circuit shown in FIG. 4 is as follows: during high-rate charging, the thyristor 27 is conductive. During low-rate charging, the thyristor 27 is blocked and charging is effected through the resistor 28. During rapid charging, the thyristor trigger is fed by the auxiliary winding 47 of the transformer 22, to render the thyristor conductive.

During low-rate charging, the feed of the trigger is interrupted by blocking of the transistor 29. The voltage control is effected by the differential amplifier comprised of paired transistors 32 and 33, which compares a fraction of the battery voltage with the reference voltage. The reference voltage is supplied by the diodes 41, 42, 43 and 44 contained in the battery and in thermal contact with the storage cells, and charged with constant current via the resistor 34, from the constant-voltage tapped across the terminals of the Zener diode 40.

The variation in the reference voltage as a function of the battery temperature is provided by varying the direct voltage drop of the diodes 41 to 44 enclosed in the battery. For as long as the fraction of the voltage across the terminals of the battery tapped at the sliding contact of 36 is lower than the reference voltage, the transistor 33 is conductive. It provides for polarization of the transistor 30 which polarizes the transistor 29; the thyristor trigger 27 is fed and it is conductive. When the battery voltage attains the value of the cut-off voltage, the voltage taken off at the sliding contact of the potentiometer 36 becomes equal to the reference voltage. The transistor 32 commences to be conductive and the transistor 33 commences to be blocked. At this instant, the transistor 31, polarized by the transistor 32, becomes conductive and produces an increase in the voltage across the terminals of the resistor 35. This cumulative effect provides for clearly-defined passage of the transistor 32 into the conductive state and of the transistor 33 into the blocked state. The transistors 30 and 29 are blocked and the trigger of the thyristor 27 is no longer fed and it becomes blocked. The voltage shift permitting a new rapid-charging flow is such that the latter is able to occur only if alternating supply cut-off of sufficient duration produces an interruption in low-rate charging.

It should be noted that the capacitor 26 associated with the resistor 25 constitutes a filter, in such manner that the trigger of the thyristor 27 is permanently triggered by a continuous signal. Furthermore, the double differential amplifier comprised of pairs of transistors 32, 33 and 30, 31 affords extremely clear blocking of the control transistor 29 and transition from rapid charging to slow charging is itself very clear and definite. It is an advantage of the present invention that it provides a circuit breaker — the thyristor 27 — for the rapid-charging circuit which is permanently controlled by a continuous signal. It should, furthermore, be noted that the capacitor 60 filters the battery voltage fraction at the input of the differential amplifier 32, 33 in such manner that the instant at which the battery voltage fraction exceeds the cut-off voltage supplied by the diodes is ascertained with a high degree of sensitivity.

On the other hand, it should also be noted that the voltage across the terminals of the battery is taken off across the terminals 15 and 16 and is then directly measured by means of the differential amplifier, in such manner as to prevent any voltage drop in connections and to guarantee a high degree of sensitivity in the device or system.

Furthermore, the charging circuit according to the invention comprises a safety thermostat 46 which if dangerous temperatures occur operates to short-circuit the trigger of the thyristor 27 and the charger passes over to the low charging rate. The said thermostatic device 40 guarantees protection of the battery against the following defects: an anomaly in the circuit comprising the diodes 41 to 44; a breakdown in the voltmeter control circuit; failure of the battery voltage to increase at the end of charging after storage for a long period of time.

The diodes 41 to 44 comprise a resistor 45 connected in series in such manner as to compensate for the variations in direct voltage of the diodes for different batteries, with a view to achieving the highest possible degree of precision in respect of the reference voltage. It is one of the advantages of the mode of regulation afforded by the adjusting resistor 45 that one end of the same charger may be used for the charging of a plurality of different batteries.

Figure 5A:
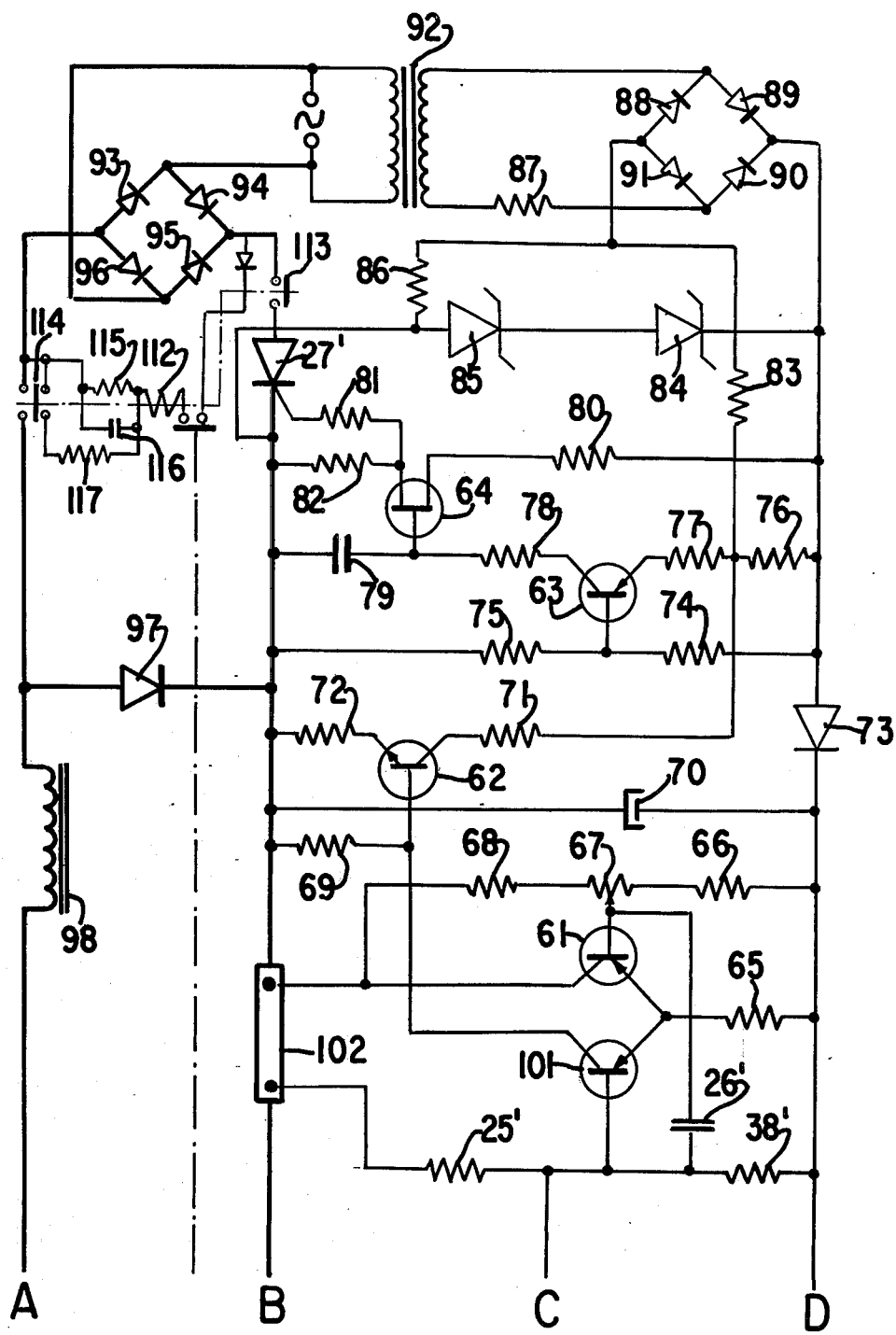
FIGS. 5A and 5B show a variant of the assembly or system also according to the invention.
Figure 5B:
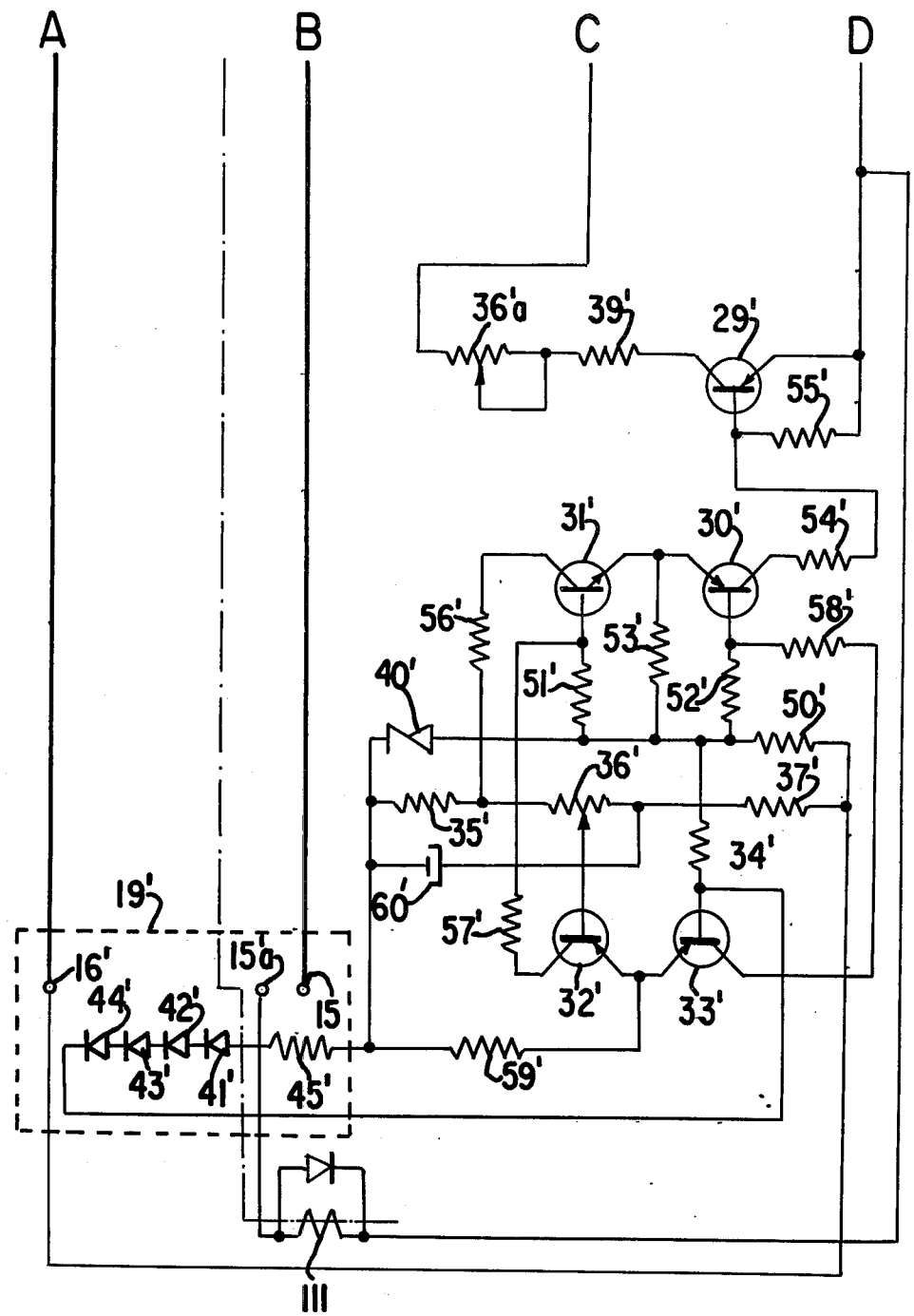

FIGS. 5A and 5B, together illustrate a variant of the charger according to the invention. The problem of the weight of a charger of this kind has already been discussed hereinabove. A charger according to the invention, intended for the charging of a battery of storage cells of relatively reduced power necessitates a transformer of relatively low weight and involves no particular transport problems; on the contrary, however, in order to charge a battery of relatively high power, the employment of a conventional power circuit (transformer and rectifier bridge) provides a weight and bulk which are incompatible with easy mobility of the apparatus. However, a transformer which has been specially designed for utility with the rapid charger according to the invention could weigh 30 to 40% less than a conventional transformer, but even this reduction in mass will nevertheless be inadequate or insufficient for practical purposes.

The embodiment of FIGS. 5A and 5B obviates these drawbacks.

FIG. 5A shows a novel circuit permitting power supply of the rapid charger according to the invention. The circuit shown in FIG. 5A is directly connected to the circuit of FIG. 5B by the connections of lines A, B, C and D of both Figures.

Reverting to FIG. 5A, the power circuit comprises: a monophase rectifier bridge fed directly by the a.c. power mains and comprising the diodes 93, 94, 95 and 96; the thyrister 27', triggering the charging rate change; the inductor 98; a recovery diode 97; and a current regulating shunt 102.

The power circuit is connected via lines B and A across the terminals 15' and 16' of the battery 19' (FIG. 5B) which is to be charged.

The energizing circuit for the thyristor 27' comprises a transformer 92 having a 1:1 ratio and providing for isolation of the control circuit for the thyristor 27.

This control circuit comprises a single-junction transistor 64 functioning with the aid of resistors 80 and 82; the trigger of the thyristor 27' is connected to the transistor 64 via the resistor 81. The capacitor 79 is charged by the transistor 63 associated with the resistors 74, 75, 76, 77, 78 and 83. The transistor 62, associated with the resistors 69, 71 and 72, with the capacitor 70 and the diode 73, is an amplification stage intermediate between the transistor 63 and the differential amplifier composed of the transistors 101 and 61 associated with the resistors 65, 66 and 68, and with the potentiometer 67. The elements of FIG. 5B — save for the relay 111 bearing reference numerals like those of FIG. 5 but primed — have been described in the course of the description given with reference to FIG. 4 and operate in like manner. The mode of functioning of the device or system of FIGS. 5A and 5B follows:

The battery 19' is fed during charging by the power circuit comprising the rectifier bridge having diodes 93, 94, 95 and 96 and also the diode 97. The thyrister control circuit is fed with rectified current via the transformer 92 and bridged diodes 88, 89, 90 and 91.

The single-junction transistor 64 energizes the thyristor 27' with the phase angle corresponding to the charging rapidity of the condenser 79. The charging of the condenser 79 is effected via the transistor 63. The resistor 83 permits, in the absence of regulation, compensation of the input voltage value, by varying the angle of excitation of the thyristor 27'.

Regulation of the current is effected with the aid of the differential amplifier constituted by transistors 101 and 61.

The differential amplifier controls the transistor 62 which varies the voltage applied to the charging circuit of the capacitor 79, in such manner as to adjust the thyristor energization angle, so as to maintain the charging current of the battery at a constant value.

The change of charging rate is triggered, as in the case of the circuit shown in FIG. 4, by the transistor 29' which takes off a portion of the dividing current from the current regulating differential amplifier. Under rapid charging conditions, the transistor 29' is conductive. Regulation of rapid charging is effected with the aid of the potentiometer 36', after having previously regulated the charging current to the low rate via the potentiometer 67.

The triggering of the control circuit providing for the change in charging rate was described in the description with reference to FIG. 4.

The present improvements provide a rapid charger for sealed storage cells, of reduced bulk and weight. By way of example, for a 7 ampere-hour battery, the weight of the needed transformer 92 is reduced from approximately 14 kg. to 4 kg. The value of the power consumed in the a.c. mains by the said charger and also the value of the effective current flowing through the circuit do not exceed the corresponding values for a transformer-type charger. Regulation of the charging current is ± 2% at the high rate and ±15% at the low rate.

In order to prevent accidental shock by contact between the operator and an element under voltage, the device or system of FIGS. 5A and 5B is completed by two safety relays, the control windings of which are designated 111 and 112 respectively. For as long as the battery tap 15'a is not connected to the circuit, the charging circuit is isolated from the mains by the gaps at two contacts 113 and 114 of the relay 112. When the battery tap is in position, the contacts are inaccessible. The coil or relay 111 is then fed with continuous voltage off at the terminals of Zener diodes 84 and 85 through intermediary of studs 15 and 15a of the tap, which are then interconnected.

The contact of the relay 111 produces excitation of the relay 112, the particular coil-feed circuit of which has been designed to provide for the excitation and holding of the relay starting from an input voltage of approximately 100 V, and in order to prevent excessive heating when the input voltage is 140 V.

The resistor 115, shunted by the capacitor 116, is connected in the coil circuit when the relay 112 is triggered. The said resistor 115 produces a voltage drop approximately equal to that of the coil of relay 112. The capacitor 116 cancels the voltage drop of the resistor 115 at the instant of excitation of the relay. The resistor 117 limits the discharge current of the capacitor in the rest contact of the relay.

The invention may be industrially applied to a charger for sealed storage cells permitting the obtaining of almost complete charging in an extremely short period of time. The type of charger described hereinabove is advantageously employed for the charging of sealed nickel-cadmium storage cells. With a charger according to the invention, it becomes possible to charge a plurality of batteries, even of different power.

Although the device or system just described would appear to be most advantageously employed for the carrying into practice of the invention, it will be understood that various modifications may be made thereto within the scope of the appended claims without departing from the invention; some of the said elements, for example, could be replaced by other elements capable of fulfilling the same technical functions. There is no intention, therefore, of limitation to the exact disclosure herein presented.

What is claimed is:

1. A d.c. charger for a sealed storage battery comprising a rapid charging circuit connected to terminals of said battery, a circuit breaker in said circuit, and a circuit for triggering said circuit breaker to effect cut-off condition of said circuit breaker and interruption of rapid charging of said battery, said last-named circuit including comparison means for permanently comparing the voltage across said battery terminals with a reference voltage during flow of said rapid charging current to the battery, means connected to said comparison means and to said circuit breaker for permanently supplying a continuous signal to said circuit breaker and for operating said circuit breaker to cut-off condition when said continuous signal changes its magnitude, an a.c. source, a transformer connected thereto and a rectifier bridge to provide d.c. charging current in said charger from said a.c. source, said circuit breaker comprising a thyristor connected to said a.c. source through a half-wave rectifier bridge, an inductor and a current regulating circuit in series with said thyristor and a diode connected in parallel with the rectifier bridge and the thyristor.

2. A d.c. charger according to claim 1 including a thyristor exciting circuit connected to said a.c. source, said last-named circuit comprising a single junction transistor, a second transistor circuit associated therewith for varying triggering or excitation angle to said thyristor to compensate for variations in input voltage of the a.c. source and to maintain constant charging current from the charger.

3. A d.c. charger according to claim 1 wherein said current regulating circuit comprises a differential transistor type amplifier and a shunt connected thereto.

4. A d.c. charger according to claim 1 including an assembly of series-connected diodes in thermal contact with said battery as means for obtaining said reference voltage.

5. A d.c. charger according to claim 4 including an adjustable resistor in series with said diodes.

6. A d.c. current charger for a sealed storage battery comprising a rapid charging circuit connected to terminals of said battery, a circuit breaker in said circuit, and a circuit for triggering said circuit breaker to effect cut-off condition of said circuit breaker and interruption of rapid charging of said battery, said last-named circuit including comparison means for permanently comparing the voltage across said battery terminals with a reference voltage during flow of said rapid charging current to the battery, means comprising series-connected diode means in thermal contact with said battery to provide said reference voltage as a function of battery temperature, means connected to said comparison means and to said circuit breaker for permanently supplying a continuous signal to said circuit breaker and for operating said circuit breaker to cut-off condition when said continuous signal changes its magnitude, and a slow charging circuit for supplying slow rate but significant charging current to the battery upon occurrence of said interruption of rapid charging thereof, said charger including an a.c. source a rectifier bridge, a transformer, a thyristor and a half-wave rectifier bridge and wherein said transformer has a single primary connected to said a.c. source and a pair of secondaries, one of said secondaries being connected to said rectifier bridge and the second of said secondaries being connected to said half-wave rectifier bridge whereby a.c. power supply of said thyristor from the second secondary is independent of the power supply from said a.c. source to said battery via said first-named rectifier bridge and said first-named one of said secondaries.

* * * * *

UNITED STATES PATENT AND TRADEMARK OFFICE
CERTIFICATE OF CORRECTION

PATENT NO. : 4,065,712
DATED : December 27, 1977
INVENTOR(S) : Pierre Godard and Robert Henri Lapuyade It is certified that error appears in the above-identified patent and that said Letters Patent are hereby corrected as shown below:

Column 2, lines 36-37, after "during" delete --,--.

Column 3, line 60, after "Furthermore" insert --,--.

Column 4, line 17, delete "2" and insert --1--.

Column 6, line 14, delete "half wave" and insert --half-wave--.

UNITED STATES PATENT AND TRADEMARK OFFICE
CERTIFICATE OF CORRECTION

PATENT NO. : 4,065,712
DATED : December 27, 1977
INVENTOR(S) : Pierre Godard and Robert Henri Lapuyade It is certified that error appears in the above-identified patent and that said Letters Patent are hereby corrected as shown below:

Column 8, line 59, delete "thrister" and insert --thyristor--.

Column 9, line 42, before "off" insert --taken--.

Column 9, line 50, delete "140" and insert --240--.

Column 11, line 1, after "source" insert --,--.

Signed and Sealed this

Twenty-third Day of May 1978

[SEAL]

Attest:

RUTH C. MASON
Attesting Officer

LUTRELLE F. PARKER
Acting Commissioner of Patents and Trademarks